United States Patent [19]

Korpman

[11] 4,166,706

[45] Sep. 4, 1979

[54] LIFT-OFF TAPE AND PROCESS

[75] Inventor: Ralf Korpman, Bridgewater, N.J.

[73] Assignee: Johnson & Johnson, New Brunswick, N.J.

[21] Appl. No.: 820,677

[22] Filed: Aug. 1, 1977

[51] Int. Cl.² .................................................. B41J 31/05
[52] U.S. Cl. ..................................... 400/696; 428/355; 428/906; 428/523; 428/521; 428/480; 428/483
[58] Field of Search ............... 197/181, 172; 428/355, 428/906, 523, 521, 480, 483; 400/696

[56] References Cited

U.S. PATENT DOCUMENTS

| | | | |
|---|---|---|---|
| 3,281,383 | 10/1966 | Zelinski | 260/879 |
| 3,519,585 | 7/1970 | Miller | 260/876 B |
| 3,649,579 | 3/1972 | Gobran | 428/355 |
| 3,676,202 | 7/1972 | Korpman | 428/355 |
| 3,787,531 | 1/1974 | Dahlquist | 260/27 BB |
| 3,924,728 | 12/1975 | Brown | 197/181 |
| 3,932,328 | 1/1976 | Korpman | 428/355 |
| 3,998,314 | 12/1976 | Barouh | 197/181 |
| 4,034,843 | 7/1977 | Newman | 197/181 |

FOREIGN PATENT DOCUMENTS 2550487 5/1977 Fed. Rep. of Germany ........... 197/181

OTHER PUBLICATIONS

*Shell Chem. Co. Tech. Bulletin, SCR:* 67-182, Oct. 1967, pp. 10, 12 and 13.
*Shell Chem. Co. Tech. Bulletin, SC:* 72-73, Aug. 1972, pp. 4, 5, and 19.

*Primary Examiner*—Ellis P. Robinson

[57] ABSTRACT

A normally nontacky but potentially tacky adhesive lift-off tape which comprises an adhesive film composition which normally exhibits a plastic nontacky state but is convertible to an elastomeric tacky state by the application of substantial stress, i.e., stretching sufficiently or striking with typewriter type, as well as the process of applying the said adhesive film. This film composition consists essentially of thermoplastic and elastomeric A-B block copolymers wherein the A-blocks are thermoplastic and the B-blocks are elastomeric and about 20-120 parts per one hundred parts by weight of the block copolymers of certain normally solid resins adapted to associate principally with the thermoplastic A-blocks of said copolymers. In these copolymers the A-blocks are derived from styrene or styrene homologues and the B-blocks are derived from conjugated dienes or lower alkenes. The normally solid resins preferably are selected from the group consisting of alpha-methylstyrene-vinyl toluene copolymers and coumarone-indene copolymers.

5 Claims, 4 Drawing Figures

U.S. Patent    Sep. 4, 1979    4,166,706
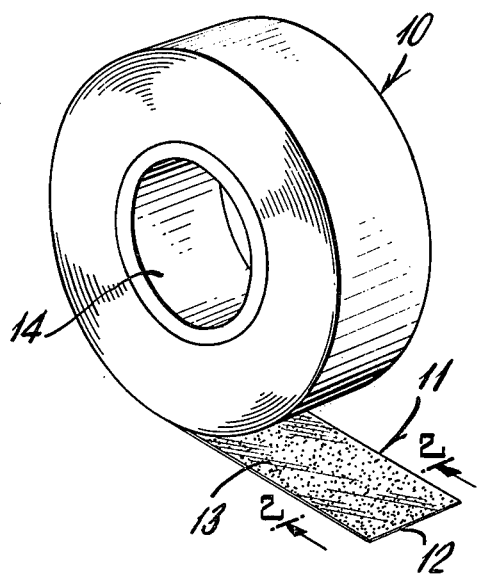
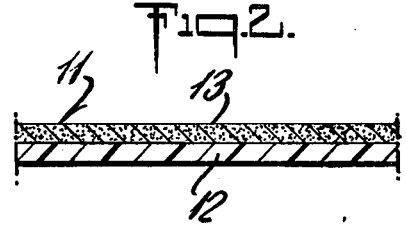
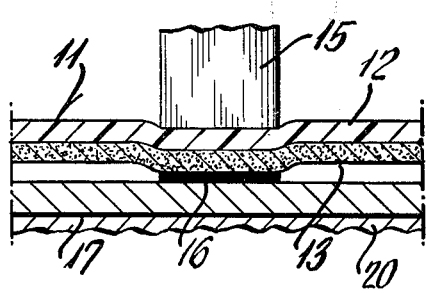
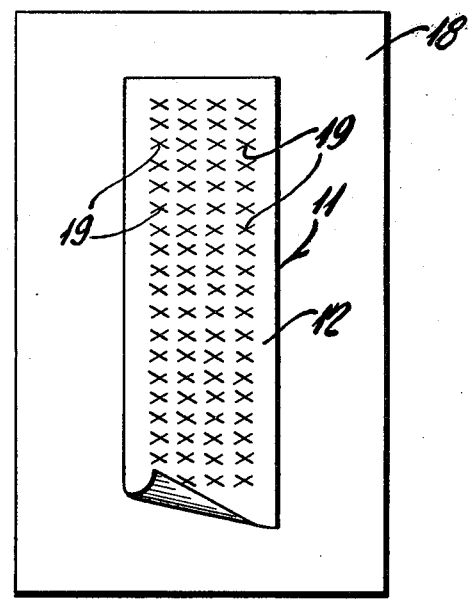

LIFT-OFF TAPE AND PROCESS

The present invention relates to normally nontacky adhesive tapes and films and processes for applying them and generally to such tapes and films which may be made tacky by the application of pressure or other stress. One important specific application of this invention is to typewriter lift-off tapes which are normally nontacky but are rendered sufficiently tacky to remove erroneous typed ink impressions by striking the tape with type activated by a typewriter key in the normal manner.

Various types of nontacky but potentially tacky adhesive tapes have been proposed which utilize means, such as spheres or particles, imbedded in a tacky adhesive surface to prevent contact with the tacky surface and thus shield the adhesive from the application surface. These tapes are activated by pressure on the back of the tape to further imbed the particles in the adhesive and thus bring the adhesive into contact with the application surface as disclosed in U.S. Pat. No. 3,924,728 which relates to a typewriter correction tape, or the applied pressure may cause hollow spheres imbedded in the adhesive surface to collapse and thus expose the adhesive as disclosed in U.S. Pat. Nos. 3,331,729 and 3,413,168. Another approach is to contain the adhesive completely within hollow capsules positioned along the surface of the tape. The capsules themselves are nontacky but adapted to break under pressure and thus render the tape tacky and adhesive as disclosed in U.S. Pat. Nos. 2,907,682 and 2,986,477. Another nontacky but potentially adhesive typewriter correction tape is disclosed in U.S. Pat. No. 3,998,314. It describes the use of a wax-like layer which picks up and removes ink impressions when pressure is applied to the tape.

Needless to say, the above-described tapes which utilize hollow spheres are expensive to produce, particularly when the spheres contain the adhesive. Furthermore, the resulting adhesive surface tends to be irregular and somewhat unpredictable in operation. The same is true of the use of solid spheres or particles imbedded in the adhesive surface for shielding purposes. Furthermore, when these tapes are wound in roll form a special release coating must be applied to the tape backing in order that the tape may be again unwound. The wax-like layer of U.S. Pat. No. 3,998,314 is not capable of developing the kind of tack necessary to remove typed ink impressions clearly and without leaving residue on the paper.

I have discovered a thermoplastic adhesive film material which normally is nontacky and is convertible to a tacky state by the application of substantial stress, i.e., stretching sufficiently or striking with typewriter type as described above. More specifically, this material exhibits a plastic state at low elongations and an elastomeric state at high elongations and is convertible from a normally nontacky and nonelastomeric plastic state to a tacky elastomeric state by stressing the material to cause it to pass through its plastic state and become tacky and elastomeric. This film material consists essentially of thermoplastic and elastomeric A-B block copolymers wherein the A-blocks are thermoplastic and the B-blocks are elastomeric and about 20–120 parts per one hundred parts by weight of the block copolymers of certain normally solid resins adapted to associate principally with the thermoplastic A-blocks of said copolymers. In these copolymers the A-blocks are derived from styrene or styrene homologues and the B-blocks are derived from conjugated dienes or lower alkenes.

In the process of my invention substantial stress is applied to a film of this normally nontacky block copolymer and resin mixture to convert at least a portion of the film from its normally nontacky and nonelastomeric plastic state to a tacky elastomeric state and then the resulting tacky portion is pressed into adhering contact with the desired application surface. This stress may be applied by stretching the film at least 100 percent in at least one direction although best results may be obtained by stretching it several hundred percent. When the film is used in a typewriter lift-off tape the film may be converted to a tacky state by striking it with typewriter type activated by a typewriter key in the normal manner while the film is supported against further movement with, or in the direction of movement of, the type by the platen roll of the typewriter.

The adhesive film of my invention is highly extensible and generally possesses an elongation to break of at least about 300 percent, although films of lower elongations to break may result when very high proportions of simple block copolymers are employed in the adhesive composition. As indicated hereinbefore, the film normally is nontacky, plastic and inelastic in nature and retains these properties at low elongations, whereas at higher elongations it becomes tacky and elastic. I have discovered that the local distortion caused by typewriter type striking the film as described hereinbefore, is sufficient to cause at least incremental conversion of the film to a tacky elastomeric state. This phenomenon will be discussed more fully hereinafter. Even though this will occur when the type strikes the film itself, I have determined that a superior adhesive tape may be produced for typewriter lift-off applications by laminating the adhesive film to a relatively inextensive nonadhesive backing film.

The normally nontacky adhesive tape of my invention comprises a nonadhesive backing layer or film and a normally nontacky and nonelastomeric adhesive layer or film on one of the major surfaces of the backing layer. Preferably the tape is wound upon itself in successive convolutions in the form of a roll with the adhesive layer facing inwardly toward the axis of the roll.

The nonadhesive backing layer or film of this invention may be formed from one of the known relatively inextensible plastics such as polyethylene terephthalate, isotactic polypropylene, vinyl chloride polymer, or the like.

As indicated hereinbefore, the adhesive layer of the tape of this invention is relatively extensible when compared with the backing layer and comprises an adhesive composition consisting essentially of thermoplastic and elastomeric A-B block copolymers wherein the A-blocks are thermoplastic and are derived from styrene or styrene homologues and the B-blocks are elastomeric and are derived from conjugated dienes or lower alkenes, together with about 20–120 parts, preferably 30–90 parts, per one hundred parts by weight of the block copolymers of certain normally solid resins adapted to associate principally with the thermoplastic A-blocks of said copolymers.

The thermoplastic and elastomeric A-B block copolymers of this invention consist essentially of linear or radial A-B-A block copolymers, mixtures of the aforesaid A-B-A block copolymers with simple A-B-block copolymers, and in some cases the simple A-B block copolymers themselves. Preferably, the proportion of A-B block copolymers in the mixture of A-B-A and A-B block copolymers does not exceed about 75 percent by weight.

The A-B-A block copolymers of this invention are of the type which consists of A-blocks (end blocks) derived, i.e., polymerized or copolymerized, from styrene or styrene homologues; and B-blocks (center blocks) derived from conjugated dienes, such as isoprene or butadiene, or from lower alkenes, such as ethylene and butylene. Small proportions of other monomers also may enter into the block copolymers themselves. The individual A-blocks have a number average molecular weight of at least about 6,000 preferably in the range of about 8,000–30,000, and the A-blocks constitute about 5–50 percent, preferably about 10–30 percent, by weight of the block copolymer. The number average molecular weight of the B-blocks for linear A-B-A block copolymers preferably is in the range of about 45,000–180,000 and that of the linear copolymer, itself, preferably is in the range about 75,000–200,000. The number average molecular weight of the radial A-B-A block copolymers preferably is in the range of about 125,000–400,000. The designation A-B-A includes what are sometimes called A-B-C block copolymers wherein the end blocks are different from one another but both are derived from styrene or styrene homologues. This applies both to linear and radial block copolymers. The term "linear block copolymer" (or copolymers) includes branched A-B-A copolymers as well as unbranched A-B-A copolymers.

The radial A-B-A polymers useful in this invention are of the type described in U.S. Pat. No. 3,281,383 and conform to the following general formula: $(A-B-)_nX$, wherein A is a thermoplastic block polymerized from styrene or styrene homologues, B is an elastomeric block derived from conjugated dienes or lower alkenes, as indicated above, X is an organic or inorganic connecting molecule with a functionality of 2–4 as described in U.S. Pat. No. 3,281,383 or possibly with a higher functionality as described in the article entitled "New Rubber is Backed by Stars" appearing on page 35 of the June 11, 1975 issue of *Chemical Week*. "n" then is a number corresponding to the functionality of X.

The simple A-B block copolymers of this invention are of the type described in U.S. Pat. Nos. 3,519,585 and 3,787,531 and comprise A and B-blocks derived from the monomers described hereinbefore in connection with the A-B-A copolymers.

The adhesive composition of this invention may include small amounts of other more conventional elastomers but these should not exceed about 25 percent by weight of the total elastomers in the composition. These other elastomers may include, highly broken down natural rubbers and butadiene-styrene random copolymer rubbers, synthetic poly-isoprene, chloroprene rubbers, nitrile rubbers, butyl rubbers, and the like. Potentially elastomeric liquid polymers also may be employed as additives but normally in lower proportions not above about 10 percent by weight of the total elastomers.

The normally solid resins of this invention consist essentially of low molecular weight resins which are adapted to associate principally with, and are principally compatible with, the thermoplastic A-blocks of the said block copolymers, and which when mixed with said A-B copolymers provide a nontacky adhesive film which exhibits a plastic state at low elongations and an elastomeric state at high elongations and is convertible from its nontacky plastic state to a tacky elastomeric state by stressing the film to cause it to pass through its plastic state and become tacky and elastomeric. Alpha-methylstyrene-vinyl toluene and coumarone-indene copolymers are examples of these normally solid A-blocks associating resins of my invention. Preferred resins for this purpose possess a number average molecular weight not above about 3,000 although higher molecular weight resins in the low weight range also may be employed. Small proportions, i.e., not above about 25 percent of the total resin content, of various other resins, also may be employed in the adhesive composition of this invention.

As indicated hereinbefore, the A-block associating resins of this invention are normally solid, i.e., they consist of solid resins but may include liquid A-block associating resins mixed in minor amounts with solid A-block associating resins provided that the resulting mixture is solid at normal room temperatures, i.e., about 70°–80° F.

The adhesive composition also may contain relatively small proportions of various other materials such as antioxidants, heat stabilizers and ultraviolet absorbers, extenders, fillers and the like. Typical antioxidants are 2,5-ditertiary amyl hydroquinone and ditertiary butyl cresol. Similarly, conventional heat stabilizing antioxidants such as the zinc salts of alkyl dithiocarbamates may be used. Relatively small proportions, not above about 25 parts by weight of the total elastomers, of various extenders such as polystyrene, nonreactive phenolformaldeyhde resins, linear polyester resins, polyethylene, polypropylene, etc., also may be included in the film forming composition of this invention. Similarly, the adhesive composition of this invention may include relatively small proportions of fillers and pigments such as zinc oxide, aluminum hydrate, clay, calcium carbonate, titanium dioxide, carbon black and others.

Other and further features and advantages of the invention will appear to one skilled in the art from the following description, examples and claims, taken together with the drawings wherein:

FIG. 1 is a view in perspective of a roll of tape according to this invention.

FIG. 2 is a schematic cross-sectional view of the tape of FIG. 1 taken along the line 2—2 of that figure.

FIG. 3 is a somewhat enlarged schematic view, partly in section and partly in elevation showing the tape of the preceding figures as it is being struck by typewriter type to remove an ink impression from a piece of typewriter paper.

FIG. 4 is a plan view illustrating the method used in the following examples to adhere the tape of this invention to a substrate by a typewriter, for the purpose of measuring the adhesive strength of the tape.

Referring to FIG. 1 of the drawings, there is shown a roll 10 of the normally non-tacky adhesive tape of this invention, wherein the tape 11 comprises a relatively inextensible and nonadhesive backing layer 12 and a relatively extensible and normally non-tacky adhesive layer 13 on one major surface of the backing layer 12. The tape 11 is wound upon itself around a hollow tubular core 14 with the adhesive layer 13 facing inwardly toward the axis of the core to form the roll. FIG. 2 illustrates the relationship between the relatively inextensible backing layer 12 and the relatively extensible adhesive layer 13.

In FIG. 3, the tape 11 is inverted with the adhesive layer 13 facing downward toward an ink impression 16 on a piece of typewriter paper 17 as the backing 12 of the tape is being struck by a type 15 activated by a typewriter key in the normal manner. The type 15 is for the same letter or number as that of the ink impression 16 so that the lines or points of maximum pressure applied by the type 15 to the tape 11 correspond in outline to that of the ink impression 16, although this outline is not shown. The adhesive layer or film 13 is distorted by the type striking the tape, particularly at the edges of the type, which of course, correspond to the edges of the ink impression. It is believed that the local or incremental distortion of the adhesive film 13 creates substantial stress in the film 13 at the edges of the ink impression 16 underneath the edges or corners of the type 15 and that, at least in these areas, the film is converted from a non-tacky plastic state to a tacky elastomeric state. At any rate, when the type strikes the tape and presses the adhesive layer 13 against the ink impression 16 on the paper 17, the adhesive layer sticks to the ink impression, and when the tape 11 is removed from the paper, the ink impression 16 is removed from or lifted-off, the paper by the tape.

When the tape 11 is stuck by the type 15 and moved into contact with the ink impression, the tape with its adhesive layer or film 13 is supported against further movement with, or in the direction of movement of, the type 15 by the platen roll 20 of the typewriter which in turn, supports the paper 17. It should be noted that the amount of distortion which occurs in the relatively extensible adhesive film 13 of the tape 11 is controlled by the fact that the adhesive film 13 is laminated to the relatively inextensible backing layer 12 which is struck first and therefore must be distorted first by the type 15. This also helps assure positive removal of the tape and the ink impression from the paper 17 when the type 15 is lifted off the tape. However, it is preferred that the thickness of the backing layer 12 be held to a minimum to assure the most efficient conversion of the adhesive film to a tacky state when the tape is struck by the type.

FIG. 4 shows a length of tape 11 of this invention adhered to a piece of standard adhesion test board 18 through four rows of the capital letter X typed onto the backing 12 of the tape while the tape is juxtaposed with the test board 18. The four rows of Xs are single spaced and are typed by activating a standard typewriter keyboard in the normal manner. This converts the adhesive layer of the tape to a tacky state underneath or along the edges of the Xs thereby adhering the tape to the test board through each of the Xs. This method is used for adhering the tape to the substrate in the following Examples 11 through 23 for the purpose of testing for adhesion or adhesive strength. The test board 18 used for testing adhesion in these examples is National Bureau of Standards standard reference 1810 liner board.

The following examples of adhesive tapes and processes according to my invention are given only by way of illustration and are not intended to limit the scope of the invention in any way. In the examples, all proportions are expressed in parts per one hundred parts by weight of the total elastomers unless otherwise indicated. Adhesive strength or adhesion to steel is measured in ounces per inch of width by peeling the tape backing over itself 180° at a constant speed (by a force applied to the free end of the tape) from a smooth steel surface, or from the test board for Examples 11–23, to which it has been applied by a fixed pressure. For the techniques used in conducting this test, see the 180° peel adhesion test PSTC-1 of the Pressure Sensitive Tape Council.

In Examples 1–10, adhesive films 5 mils thick are extruded from the formulations indicated in Table-A. The extruded films are then stretched several hundred percent of their length to convert them from their normally nontacky plastic state to a tacky elastomeric state. As the films are stretched a visible change takes place as they are converted from a nontacky to a tacky state. The tacky stretched films then are allowed to relax after which they are laminated to lengths of 1 mil thick polyethylene terephthalate film by rolling the films together with a four and one half pound roller. The resulting adhesive tapes then are tested for adhesion to steel as described hereinbefore. The results are listed in Table A with any adhesion reading of 3 ounces or below being rounded out to zero. While the adhesions obtained are somewhat erratic, they do indicate maximum effectiveness, with the formulations tested, in the area of 60 to 80 parts solid resin.

TABLE A

| Ingredients and Properties | EXAMPLES | | | | | | | | | |
|---|---|---|---|---|---|---|---|---|---|---|
| | 1 | 2 | 3 | 4 | 5 | 6 | 7 | 8 | 9 | 10 |
| Kraton 1107 block copolymer | 100 | 100 | 100 | 100 | 100 | 100 | 100 | 100 | 100 | 100 |
| Piccotex 120 solid resin | 40 | | 60 | | 80 | | 100 | | 120 | |
| Piccotex 100 solid resin | | 40 | | 60 | | 80 | | 100 | | 120 |
| Zinc dibutyl dithiocarbamate | 2 | 2 | 2 | 2 | 2 | 2 | 2 | 2 | 2 | 2 |
| 2,5-ditertiary amyl hydroquinone | 0.5 | 0.5 | 0.5 | 0.5 | 0.5 | 0.5 | 0.5 | 0.5 | 0.5 | 0.5 |
| Adhesion to steel after stretching, oz./in. width | 0 | 0 | 29 | 22 | 11 | 21 | 10 | 11 | 9 | 0 |

In Examples 11–20, adhesive films 5 mils thick are again extruded from the formulas described in Table B. Then lengths of the film are juxtaposed with National Bureau of Standards standard reference 1810 liner board, adhered thereto by typewriter and tested for adhesive strength, as described hereinbefore in connection with FIG. 4 with adhesions being rounded out as for Examples 1–10. While the results indicate adhesions less than for Examples 1–10, this is understandable since the tape in Examples 11–20 is adhered to the test board only under the Xs as compared with the substantially continuous adherence between the stretched rolled films of Examples 1–10. Those adhesive films having an adhesive strength of 4 oz./in. width or above by this test are capable of performing as typewriter lift-off tapes as described hereinbefore, although those having an adhesive strength in the neighborhood of 10 oz./in. width perform more satisfactorily.

TABLE B

| Ingredients and Properties | EXAMPLES | | | | | | | | | |
|---|---|---|---|---|---|---|---|---|---|---|
| | 11 | 12 | 13 | 14 | 15 | 16 | 17 | 18 | 19 | 20 |
| Kraton 1107 block copolymer | 100 | 100 | 100 | 100 | 100 | 100 | 100 | | | |
| Kraton 1102 block copolymer | | | | | | | | 100 | 100 | 100 |
| Piccotex 120 solid resin | 40 | 50 | 60 | 70 | 80 | 90 | 100 | 40 | 60 | 80 |
| Zinc dibutyl dithiocarbamate | 2 | 2 | 2 | 2 | 2 | 2 | 2 | 2 | 2 | 2 |
| 2,5-ditertiary amyl hydroquinone | 0.5 | 0.5 | 0.5 | 0.5 | 0.5 | 0.5 | 0.5 | 0.5 | 0.5 | 0.5 |
| Adhesive strength, oz./in. width | 4 | 7 | 8 | 10 | 11 | 13 | 0 | 12 | 13 | 6 |

In Examples 21–33 adhesive films 0.75 mils thick (weighing about 0.75 oz./yd.²) are coated from the formulations described in Table-C onto one major surface of a polyethylene terephthalate backing film, also 0.75 inches thick, to produce tapes of this invention. The tapes then are applied to test board by typewriter with the type striking the backing film as described in connection with FIG. 4 and Examples 11–20, with the results being rounded as in the foregoing examples. It will be noted that the adhesions obtained in all but Example 25 are adequate for typewriter lift-off applications. It also should be noted that the values for adhesive strength obtained in these examples are, if anything, somewhat higher than for Examples 11–20 even though the thickness of the adhesive film in Examples 21–33 is only 0.75 mils, as compared with 5 mils for Examples 11–20, and the very thin film of Examples 21–33 is covered with an equally thin backing film of a Mylar type polyester.

In the foregoing examples Kraton 1107 block copolymer is a thermoplastic elastomeric A-B-A (styrene-isoprene-styrene) block copolymer of this invention offered by the Shell Chemical Company, wherein the styrene content (that of the A-blocks) is about 12–15 percent, closer to 15 percent by weight of the block copolymer, and the polymer possesses a solution viscosity of about 2,000 centipoises at 25 percent solids in toluene at room temperature (using a Brookfield Viscometer with a No. 4 spindle at 60 r.p.m.), and a number average molecular weight of about 110,000–125,000. Kraton 1102 copolymer is another A-B-A block copolymer offered by Shell but this is a styrene-butadiene-styrene copolymer wherein the styrene blocks constitute about 28–30 percent of the copolymer. The number average molecular weight of Kraton 1102 copolymer also is about 125,000.

TABLE C

| Ingredients and Properties | EXAMPLES | | | | | | | | | | | | |
|---|---|---|---|---|---|---|---|---|---|---|---|---|---|
| | 21 | 22 | 23 | 24 | 25 | 26 | 27 | 28 | 29 | 30 | 31 | 32 | 33 |
| Kraton 1107 block copolymer | 100 | 100 | 100 | 100 | 100 | 100 | 100 | | | | | | |
| Kraton 1102 block copolymer | | | | | | | | 100 | 100 | 100 | 100 | 100 | 100 |
| Piccotex 120 solid resin | 50 | 60 | 70 | 80 | 90 | | | 40 | 60 | 80 | | | |
| Cumar LX-509 solid resin | | | | | | 60 | 80 | | | | 40 | 60 | 80 |
| Zinc dibutyl dithiocarbamate | 2 | 2 | 2 | 2 | 2 | 2 | 2 | 2 | 2 | 2 | 2 | 2 | 2 |
| 2,5-ditertiary amyl hydroquinone | 0.5 | 0.5 | 0.5 | 0.5 | 0.5 | 0.5 | 0.5 | 0.5 | 0.5 | 0.5 | 0.5 | 0.5 | 0.5 |
| Adhesive strength, oz./in. width | 10 | 13 | 10 | 8 | 0 | 10 | 14 | 13 | 13 | 10 | 6 | 10 | 7 |

Cumar 509 LX resin is a solid coumarone-indene copolymer resin offered by the Neville Chemical Co., and having a softening point of about 145° C. Piccotex 100 and 120 resins are alpha-methyl styrene-vinyl toluene copolymers offered by Hercules Chemical Co., with melting points of 100° C. and 120° C., respectively.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope. For instance, although they have not been described or shown more specifically, various additional coatings or layers conventionally incorporated in adhesives tapes intended to be wound in roll form also may be included in the adhesive tape of this invention. This is particularly true when the tape must be designed to withstand aging at fairly high temperatures. Since high temperatures may cause flow of the thermoplastic adhesive, a release coating may be desired on the surface of the backing opposite to the adhesive to assure easy unwind from the roll and a primer layer may be desired between the adhesive and the backing to assure that delamination does not occur between the adhesive and the backing under even the most extreme circumstances.

What is claimed is:

1. The process of applying an adhesive film to an application surface which comprises:

a. selecting a normally nontacky and normally nonelastomeric adhesive film consisting essentially of thermoplastic and elastomeric A-B block copolymers wherein the A-blocks are thermoplastic and possess a number average molecular weight of at least about 6,000 and the B-blocks are elastomeric and possess a number average molecular weight in the range of about 45,000–180,000, and 20–120 parts per one hundred parts by weight of the block copolymers of normally solid resins adapted to associate principally with the thermoplastic A-blocks of said copolymers; said A-blocks constituting about 5–50 percent by weight of the block copolymer and being derived from styrene or styrene homologues said B-blocks being derived from conjugated dienes or lower alkenes, said film exhibiting a plastic state at low elongations and an elastomeric state at high elongations and being convertible from a normally nontacky and nonelastomeric plastic state to a tacky elastomeric state by subjecting said film to substantial stress to cause it to pass through its plastic state and become tacky and elastomeric;

b. subjecting a portion of said film to substantial stress to cause it to pass through its plastic state and become tacky and elastomeric; and c. pressing the resulting tacky and elastomeric portion of said film into adhering contact with said surface.

2. A process according to claim 1, wherein steps (b) and (c) are performed substantially simultaneously.

3. A process according to claim 2, wherein the aforesaid portion of said normally nontacky and normally nonelastomeric adhesive film is stressed and converted to a tacky and elastomeric state by striking said portion perpendicularly of said film with typewriter type activated by a typewriter key in the normal manner while said film is supported against further movement with said type.

4. A process according to claim 3, wherein said tacky portion is defined by the shape of the type striking the film and said tacky portion adheres to an ink impression also corresponding in shape to said type on said application surface, and which further comprises lifting said film from said surface to remove said ink impression from said surface.

5. A process according to claim 1, wherein the aforesaid portion of said normally nontacky and normally nonelastomeric adhesive film is stressed and converted to a tacky and elastomeric state by stretching the said portion of said film at least about 100 percent in one direction.

* * * * *